Oct. 21, 1969  J. R. KOUPAL  3,474,266
ELECTROGASDYNAMIC POWER CYCLE
Filed March 24, 1967
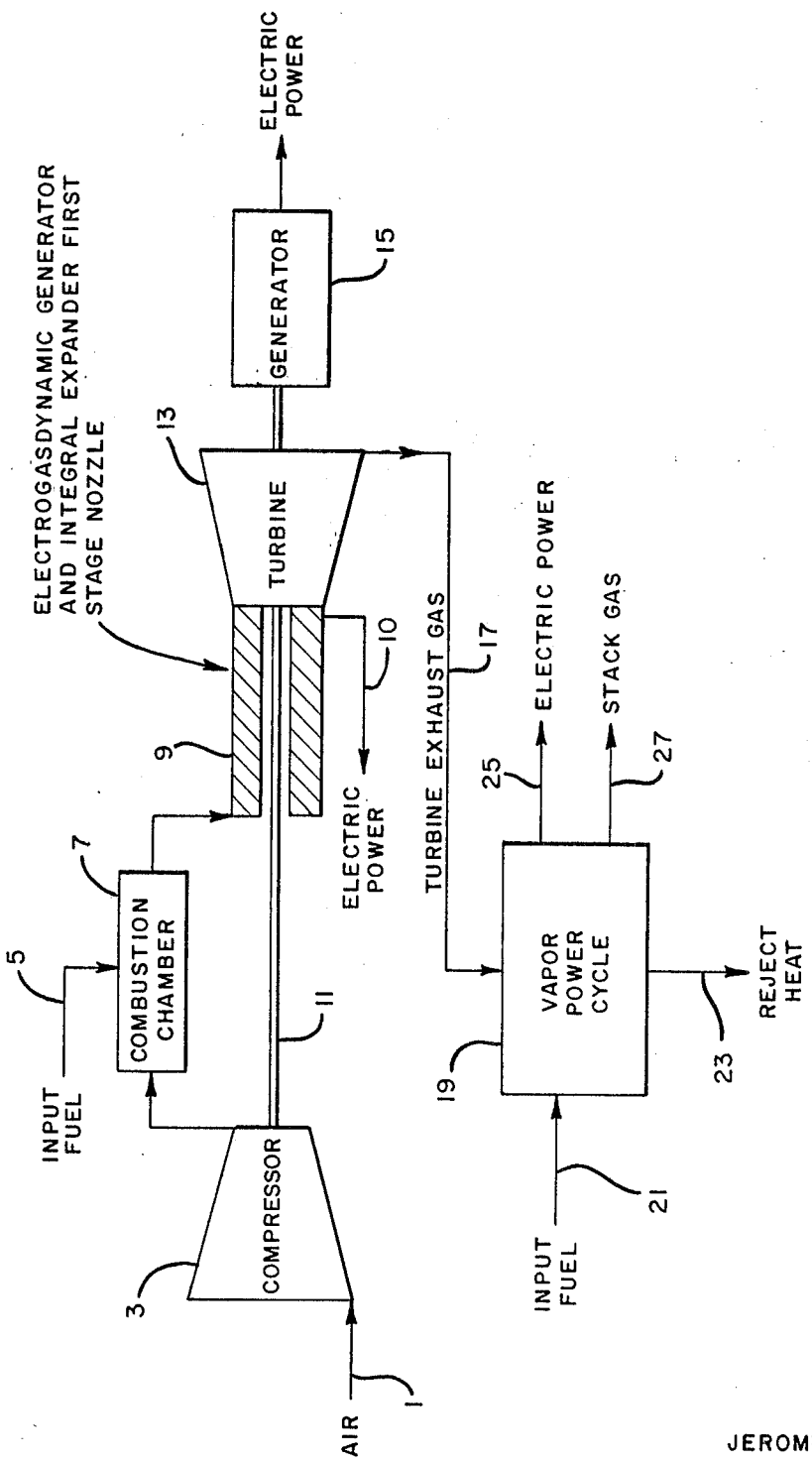
INVENTOR.
JEROME R. KOUPAL
BY
ATTORNEYS United States Patent Office 3,474,266
Patented Oct. 21, 1969

3,474,266
ELECTROGASDYNAMIC POWER CYCLE
Jerome R. Koupal, San Francisco, Calif., assignor, by mesne assignments, to Bechtel International Corporation, San Francisco, Calif., a corporation of Delaware
Filed Mar. 24, 1967 Ser. No. 625,836
Int. Cl. H02n 1/06; G21d 7/02
U.S. Cl. 310—5                                    4 Claims

ABSTRACT OF THE DISCLOSURE

Electrogasdynamic combined power cycle wherein the exhaust gas from the EGD generator is utilized for the generation of electric power whereby improved efficiency is obtained. The exhaust gas is led directly to a vapor power cycle from the EGD generator for additional electrical power generation.

BACKGROUND OF THE INVENTION

Field of the invention

Electrogasdynamic combined power cycle.

Description of prior art

Prior EGD generators exhausted gas at a high temperature, thereby wasting heat.

SUMMARY OF THE INVENTION

Electrogasdynamic generators (sometimes abbreviated as EGD generators) are well known. In accordance with the present invention, an efficient means is provided for utilizing the otherwise wasted heat exhausted from the EGD generator.

Accordingly, it is an object of the present invention to provide an EGD power cycle of generally improved design.

The cycle of the present invention is a means of exploiting an electrogasdynamic generator to obtain higher thermodynamic efficiency by permitting a higher combustion chamber discharge temperature; the combustion chamber discharge temperature can be dictated by existing materials technology and the turbine material technology. It is possible to generate higher temperatures within existing combustion chamber material technology than can be accepted by a turbine constructed within existing turbine material technology. The EGD generator is used to recover energy between the two operating temperature limits.

BRIEF DESCRIPTION OF THE DRAWING

The sole figure of the drawing is a diagram of a preferred embodiment of the present invention.

DESCRIPTION OF THE PREFERRED EMBODIMENTS

Referring to the drawing by reference characters, air is introduced through line 1 to a compressor 3, and the thus compressed air is injected into a combustion chamber 7 where it is mixed with input fuel from line 5 and burned. The combustion products pass into the EGD generator 9 where a portion of its energy is extracted and turned into electric power and taken off through line 10. The exhaust goes into turbine 13 where it turns shaft 11 operating the compressor 3 and optionally operates a generator 15 from which one may obtain additional electric power. In many instances, the entire output of the turbine 13 is necessary to operate the compressor 3 in which case the generator 15 is not used. The turbine exhaust is taken through line 17 to a vapor power cycle 19. The vapor power cycle includes suitable heat exchangers and vapor power driven generator and these are not shown in detail since these are well known to those skilled in the art. In addition, the vapor power cycle can include a secondary combustion chamber, in which case additional fuel may be supplied through line 21. In the vapor power cycle 19, additional electric power is generated and taken off through line 25 while reject heat and stack gas are taken off through lines 23 and 27 respectively.

The system of the present invention offers a number of advantages over systems heretofore known. By utilizing the turbine exhaust gas as the source of heat for a vapor power cycle, which may or may not be augmented in an additional combustion zone, a highly efficient cycle is achieved so that full advantage is taken of the high temperature gas leaving the turbine 13.

I claim:
1. An electrogasdynamic power cycle comprising in combination:
   (a) a compressor for compressing air;
   (b) a combustion zone for receiving such compressed air and a fuel to generate a stream of high temperature combustion products;
   (c) an electrogasdynamic generator directly in said stream utilizing such stream of combustion products as the direct working fluid for the generation of electric power;
   (d) a turbine directly in the exhaust stream of said electrogasdynamic generator said turbine directly driving said compressor and producing a turbine exhaust gas stream and
   (e) a vapor power cycle employing said exhaust gas from said turbine to generate additional electric power.
2. The cycle of claim 1 wherein said turbine also drives a generator for the generation of electric power.
3. The structure of claim 1 wherein the vapor cycle includes a combustion zone and fresh fuel is fed to said combustion zone in said vapor power cycle.
4. The structure of claim 1 wherein the turbine has an integral first stage nozzle-electrogasdynamic generator combination.

References Cited

UNITED STATES PATENTS

| | | | |
|---|---|---|---|
| 3,294,989 | 12/1966 | Eichenberger | 310—11 |
| 3,308,622 | 3/1967 | Caplinger et al. | 310—4 X |
| 3,337,759 | 8/1967 | Daman | 310—11 |
| 3,355,609 | 11/1967 | Horn et al. | 301—11 |
| 3,401,277 | 9/1968 | Larson | 310—11 |
| 3,405,291 | 10/1968 | Brandmaier | 310—5 X |
| 3,417,267 | 12/1968 | Marks | 310—6 |
| 3,297,887 | 1/1967 | Marks | 310—4 |
| 3,312,054 | 4/1967 | Anderson et al. | 310—4 X |
| 3,346,747 | 10/1967 | Larson | 310—5 X |
| 3,349,248 | 10/1967 | Garnier | 310—4 X |
| 3,158,764 | 11/1964 | Webb | 310—11 |
| 3,319,090 | 5/1967 | Dzung | 310—11 |

FOREIGN PATENTS 870,446   6/1961   Great Britain.

MILTON O. HIRSHFIELD, Primary Examiner
D. F. DUGGAN, Assistant Examiner

U.S. Cl. X.R.
310—11